(12) United States Patent
Tamura et al.

(10) Patent No.: US 10,155,687 B2
(45) Date of Patent: *Dec. 18, 2018

(54) OPTICAL FIBER PREFORM

(71) Applicant: SUMITOMO ELECTRIC INDUSTRIES, LTD., Osaka-shi, Osaka (JP)

(72) Inventors: Yoshiaki Tamura, Kanagawa (JP); Tetsuya Haruna, Kanagawa (JP); Yuki Kawaguchi, Kanagawa (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/137,255

(22) Filed: Apr. 25, 2016

(65) Prior Publication Data
US 2016/0318793 A1 Nov. 3, 2016

(30) Foreign Application Priority Data

Apr. 30, 2015 (JP) ................. 2015-092754

(51) Int. Cl.
| | | |
|---|---|---|
| *G02B 6/02* | (2006.01) | |
| *C03C 13/04* | (2006.01) | |
| *C03B 37/014* | (2006.01) | |
| *C03B 37/012* | (2006.01) | |
| *C03B 37/018* | (2006.01) | |

(52) U.S. Cl.
CPC .......... *C03C 13/046* (2013.01); *C03B 37/014* (2013.01); *C03B 37/0124* (2013.01);
(Continued)

(58) Field of Classification Search
CPC .... G02B 6/02; G02B 6/02395; G02B 6/0288; G02B 6/03622; G02B 6/0281;
(Continued)

(56) References Cited

U.S. PATENT DOCUMENTS

| | | |
|---|---|---|
| 5,146,534 A | 9/1992 | Lines |
| 7,088,900 B1 | 8/2006 | Mishra |

(Continued)

FOREIGN PATENT DOCUMENTS

| | | |
|---|---|---|
| JP | 2005-537210 A | 12/2005 |
| JP | 2007-504080 A | 3/2007 |

(Continued)

OTHER PUBLICATIONS

Office Action dated Dec. 28, 2017 that issued in U.S. Appl. No. 15/700,493.

*Primary Examiner* — Camie S Thompson
(74) *Attorney, Agent, or Firm* — Drinker Biddle & Reath LLP

(57) ABSTRACT

An optical fiber preform of the present embodiment comprises a core portion and a cladding each comprised of silica glass. The core portion has a first dopant region including a central axis of the core portion and a second dopant region away from the central axis. The first dopant region contains a first dopant selected from among Na, K, and their compounds, and a concentration of the first dopant is 10 atomic ppm or more but 2,000 atomic ppm or less. The second dopant region contains a second dopant reducing viscosity of the silica glass. The second dopant has, as a characteristic at a temperature of 2,000° C. to 2,300° C., a diffusion coefficient of $1 \times 10^{-12}$ cm$^2$/s or higher but lower than that of the first dopant, and a concentration of the second dopant region is 10 atomic ppm or more.

6 Claims, 16 Drawing Sheets

(52) U.S. Cl.
CPC .. *C03B 37/01211* (2013.01); *C03B 37/01237* (2013.01); *C03B 37/01807* (2013.01); *C03B 37/01861* (2013.01); *C03B 2201/12* (2013.01); *C03B 2201/20* (2013.01); *C03B 2201/50* (2013.01); *C03B 2201/54* (2013.01); *C03B 2203/22* (2013.01); *C03B 2203/222* (2013.01); *C03C 2201/12* (2013.01); *C03C 2201/50* (2013.01); *C03C 2201/54* (2013.01)

(58) Field of Classification Search
CPC .... G02B 6/0295; G02B 6/262; G02B 6/0285; G02B 6/03694; C03B 2201/50; C03B 2203/34; C03B 2201/12; C03B 2201/20; C03B 2201/54; C03C 13/045; C03C 13/04; C03C 2201/50; C03C 2201/12; C03C 27/0124; C03C 13/046; C03C 2201/54; C03C 2203/46
USPC ....... 385/123, 124, 127, 128, 126, 141, 144; 428/392, 428; 427/163.2, 237
See application file for complete search history.

(56) References Cited

U.S. PATENT DOCUMENTS

| | | | |
|---|---|---|---|
| 9,575,245 B2* | 2/2017 | Tamura | G02B 6/02 |
| 2006/0130530 A1 | 6/2006 | Anderson et al. | |
| 2016/0147010 A1* | 5/2016 | Tamura | G02B 6/02 385/123 |
| 2017/0371096 A1 | 12/2017 | Sakuma et al. | |

FOREIGN PATENT DOCUMENTS

| | | | | |
|---|---|---|---|---|
| JP | 2007-513862 A | 5/2007 | | |
| JP | 2008-536190 A | 9/2008 | | |
| JP | 2009-541796 A | 11/2009 | | |
| JP | 2010-501894 A | 1/2010 | | |
| JP | 2010-526749 A | 8/2010 | | |
| JP | 2012-162409 A | 8/2012 | | |
| WO | WO-98/02389 A1 | 1/1998 | | |
| WO | WO-2013077263 A1 * | 5/2013 | ....... | C03B 37/01807 |

* cited by examiner

Fig.13

| ATOM | Na | K | Cs | Ca |
|---|---|---|---|---|
| DIFFUSION COEFFICIENT (cm$^2$/s) | $6 \times 10^{-5}$ | $4 \times 10^{-6}$ | $2 \times 10^{-6}$ | $6 \times 10^{-7}$ |

Fig.15

| OPTICAL FIBER PREFORM ||||  OPTICAL FIBER |
| --- | --- | --- | --- | --- |
| DIAMETER OF FIRST CORE PORTION (mm) | SECOND DOPANT PEAK $2r_1$ (mm) | CORE PORTION $2r_2$ (mm) | $r_2/r_1$ | TRANSMISSION LOSS [dB/km] |
| 1.2 | 1.4 | 17 | 12.5 | 0.189 |
| 1.4 | 1.6 | 17 | 10.4 | 0.175 |
| 1.6 | 1.8 | 17 | 9.6 | 0.162 |
| 1.8 | 2.0 | 17 | 8.3 | 0.16 |
| 2.2 | 2.4 | 17 | 6.9 | 0.157 |
| 2.4 | 2.6 | 17 | 6.6 | 0.156 |
| 2.5 | 2.7 | 17 | 6.3 | 0.156 |
| 2.8 | 3.0 | 17 | 5.7 | 0.155 |
| 3.2 | 3.4 | 17 | 5.0 | 0.156 |
| 3.6 | 3.8 | 17 | 4.5 | 0.157 |
| 3.9 | 4.1 | 17 | 4.2 | 0.157 |
| 4.6 | 4.8 | 17 | 3.6 | 0.159 |
| 5.0 | 5.2 | 17 | 3.3 | 0.16 |
| 5.2 | 5.4 | 17 | 3.1 | 0.163 |
| 5.6 | 5.8 | 17 | 2.9 | 0.175 |
| 6.3 | 6.5 | 17 | 2.6 | 0.178 |
| 6.9 | 7.1 | 17 | 2.4 | 0.183 |

OPTICAL FIBER PREFORM

TECHNICAL FIELD

The present invention relates to an optical fiber preform.

BACKGROUND

As an optical fiber with a low Rayleigh scattering loss and a low transmission loss, silica-based optical fibers each having a core doped with an alkali metal element are known as can be seen from, for example, Japanese Patent Application (translation of PCT application) Laid-Open No. 2005-537210W (Patent Literature 1) and US Patent Application Laid-Open. No. 2006/0130530 (Patent Literature 2). Inclusion of an alkali metal element in a core portion of an optical fiber preform can reduce viscosity of the core portion in drawing the optical fiber preform itself and uniforms a network structure of a silica glass. Therefore, the Rayleigh scattering loss attributable to an ununiform structure can be reduced.

As a method for doping an alkali metal element in a silica glass, a diffusion method is known as can be seen from, for example, Patent Literature 1 and Patent Literature 2. The diffusion method is to diffuse and dope an alkali metal element in an inner surface of a glass pipe by heating the glass pipe by an external heat source or generating plasma in the glass pipe while a raw material vapor such as an alkali metal element or alkali metal salt serving as a raw material is introduced into the glass pipe.

After doping the alkali metal element into a vicinity of the inner surface of the glass pipe in this way, the glass pipe is heated for diameter reduction. After the diameter reduction, the inner surface of the glass pipe is etched by a certain thickness with an aim to remove a transition metal element such as Ni (nickel) and Fe (iron), added simultaneously in doping an alkali metal element. An alkali metal element is faster in diffusion than the transition metal element. Therefore, even after a transition metal element is removed by etching a glass surface by a certain thickness, it is possible to cause the alkali metal element to remain. After etching, a core rod containing an alkali metal element is manufactured by heating the glass pipe for collapse. It is possible to apply a glass serving as a second core portion on the outer periphery of the core rod containing an alkali metal element, and handle the whole of the core rod and the second core portion as a part to be a core of the optical fiber.

The optical fiber preform is manufactured by providing a cladding portion on the outer periphery of the core portion, and the cladding portion has a refractive index lower than that of the core portion which includes the core rod containing an alkali metal element. Then, by drawing of the optical fiber preform, the optical fiber can be manufactured.

SUMMARY

The present inventor has obtained knowledge described below in research and development of an optical fiber containing an alkali metal element and having a low transmission loss. There is a correlation between an average concentration of the alkali metal element contained in a core and the transmission loss, and it is necessary to dope an alkali metal element in an entire core in order to reduce the transmission loss. However, the doping of an alkali metal element by the above-mentioned diffusion method forms a concentration distribution shape that a concentration of the alkali metal element is high in a center of the core and decreases toward a periphery thereof. Thus, a method has been considered where an alkali metal element is doped at a position away from a central axis of the core, but most elements having a fast diffusion rate such as Na (natrium) and K (potassium) are diffused into a cladding and drawn out of the core. Therefore, loss reducing effects by an alkali metal element have been diminished. In a method for doping an alkali metal element in high concentration in advance considering leaching of the alkali metal element into the cladding, fiber-fabrication has been difficult due to crystallization.

The present invention has been made in view of the above problem, and an object thereof is to provide an optical fiber preform, from which an optical fiber with a low transmission loss can be obtained.

An optical fiber preform according to an embodiment of the present invention comprises a core portion comprised of silica glass and a cladding portion comprised of silica glass. The core portion extends along a central axis thereof and, in a cross-section of the optical fiber preform orthogonal to the central axis, has a first dopant region and a second dopant region. The first dopant region contains a first dopant and includes the central axis. The first dopant is selected from among Na, K, and their compounds, and a concentration of the first dopant is set at 10 atomic ppm or more but 2,000 atomic ppm or less. On the other hand, the second dopant region contains a second dopant for reducing viscosity of the silica glass and surrounds the central axis while being away from the central axis. In other words, the second dopant region excludes the central axis. The second dopant has, as a characteristic at a temperature of 2,000° C. to 2,300° C., a diffusion coefficient of $1 \times 10^{-12}$ cm$^2$/s or higher but lower than that of the first dopant, and a concentration of the second dopant is set at 10 atomic ppm or more. The cladding portion surrounds an outer periphery of the core portion, and contains F (fluorine). Therefore, the cladding portion has a refractive index lower than that of the core portion. Here, atomic ppm means the number of dopant atoms in 100 million units of $SiO_2$.

It is preferable that a ratio (r2/r1) of a radius r2 of the core portion to a distance r1 from the central axis falls within a range from 3 to 9.5. Here, the distance r1 is defined as a distance from the central axis to a position where a concentration peak of the second dopant exists. It is preferable that the second dopant includes any one selected from among Rb (rubidium), Cs (cesium), Mg (magnesium), Ca (calcium) and Sr (strontium). Furthermore, in the cross-section of the optical fiber preform, the first and second dopant regions may overlap each other. An outer periphery of the first dopant region may be away from or may correspond to an inner periphery of the second dopant region.

According to an embodiment of the present invention, an optical fiber preform, from which an optical fiber with a low transmission loss can be obtained, is provided.

BRIEF DESCRIPTION OF THE DRAWINGS

FIG. 13 is a table of each diffusion coefficient of Na, K, Cs, and Ca;

FIG. 15 is a table of specifications of each optical fiber preform according to the present embodiment and transmission losses of optical fibers obtained from these optical fiber preform.

DETAILED DESCRIPTION

An optical fiber preform according to an embodiment of the present invention comprises a core portion comprised of silica glass and a cladding portion comprised of silica glass. The core portion extends along a central axis thereof and, in a cross-section of the optical fiber preform orthogonal to the central axis, has a first dopant region and a second dopant region. The first dopant region contains a first dopant and includes the central axis. The first dopant is selected from among Na, K, and their compounds, and a concentration of the first dopant is set at 10 atomic ppm or more but 2,000 atomic ppm or less. On the other hand, the second dopant region contains a second dopant for reducing viscosity of the silica glass and surrounds the central axis while being away from the central axis. In other words, the second dopant region excludes the central axis. As a characteristic at a temperature of 2,000° C. to 2,300° C., a diffusion coefficient of the second dopant is $1\times10^{-12}$ cm$^2$/s or higher, but the diffusion coefficient of the second dopant is lower than that of the first dopant. In addition, a concentration of the second dopant is set at 10 atomic ppm or more. The cladding portion surrounds an outer periphery of the core portion, and contains F. Therefore, the cladding portion has a refractive index lower than that of the core portion.

Embodiments according to the present invention will be described below in detail with reference to the attached drawings. The present invention is not limited to these examples and includes all changes provided in the claims and the scope of equivalents thereof.

Figure 1:
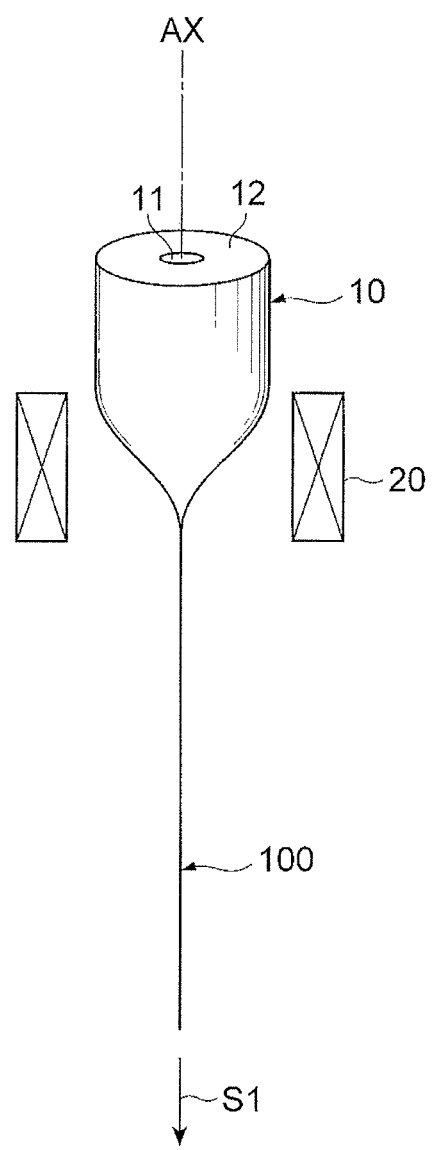
FIG. 1 is a diagram indicating a drawing step.

FIG. 1 is a diagram indicating a drawing step for obtaining an optical fiber. As shown in FIG. 1, the optical fiber preform 10 according to the present embodiment comprises: the core portion 11 comprised of silica glass and extending the central axis AX of the optical fiber preform 10; and the cladding portion 12 comprised of silica glass and surrounding the core portion 11. In a cross section of the optical fiber preform 10 orthogonal to the central axis AX, the center of the core portion 11 corresponds to the central axis AX. The core portion 11 contains the dopant for reducing the viscosity of the silica glass. The cladding portion 12 has a refractive index lower than that of the core portion 11 and contains F. One end of the optical fiber preform 10 is, as shown in FIG. 1, softened by heating of the heater 20. An optical fiber 100 can be obtained by drawing the softened portion along a direction shown by the arrow S1 in FIG. 1. The cross sectional structures of the optical fiber preform 10 and the obtained optical fiber 100 are similar, and therefore the core portion 11 corresponds to a core of the optical fiber 100 and the cladding portion 12 corresponds to a cladding of the optical fiber 100.

In a case where, as shown in FIG. 1, an optical fiber 100 is manufactured by fabricating and drawing the optical fiber preform 10 with the dopant for reducing the viscosity of the glass doped in the core portion 11 by a diffusion method, the dopant doped in the core portion 11 is diffused into the cladding portion 12 on an outer periphery of the core portion 11 by heating during drawing. This reduces the viscosity of the cladding portion 12 as well as the core portion 11. The cladding portion 12 originally contains F. Therefore, it is considered that a co-doping effect of the dopant and fluorine (F) substantially reduces the viscosity of the cladding portion 12, resulting in a difference in viscosity between the core and cladding portions 11, 12 and an increase in transmission loss attributable to residual strain in the optical fiber 100.

Figure 2:
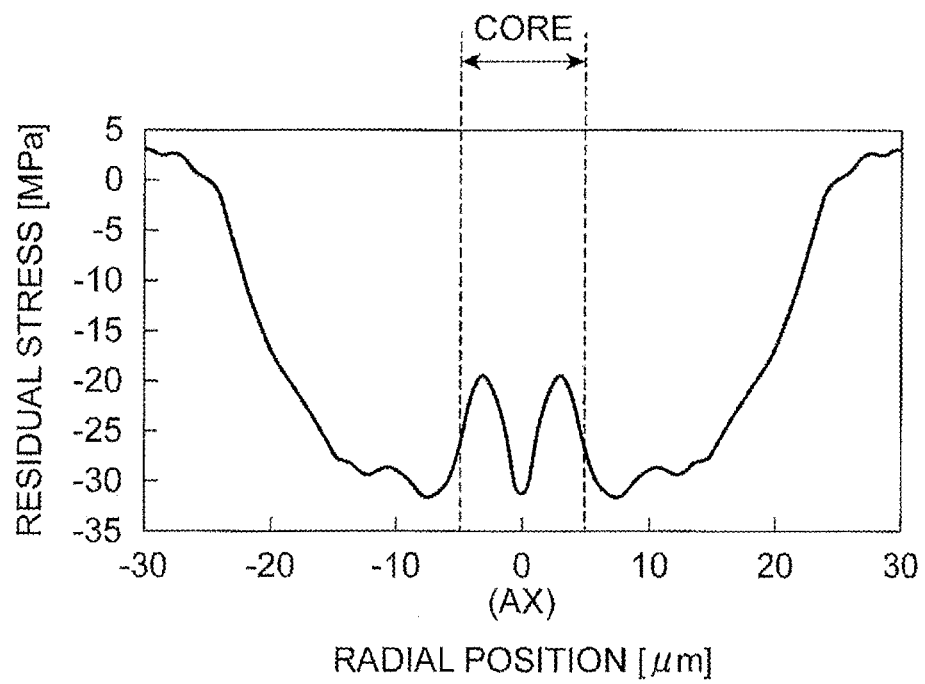
FIG. 2 is a diagram illustrating an example of a radial distribution of residual stresses in an optical fiber containing K in a core thereof.
Figure 3:
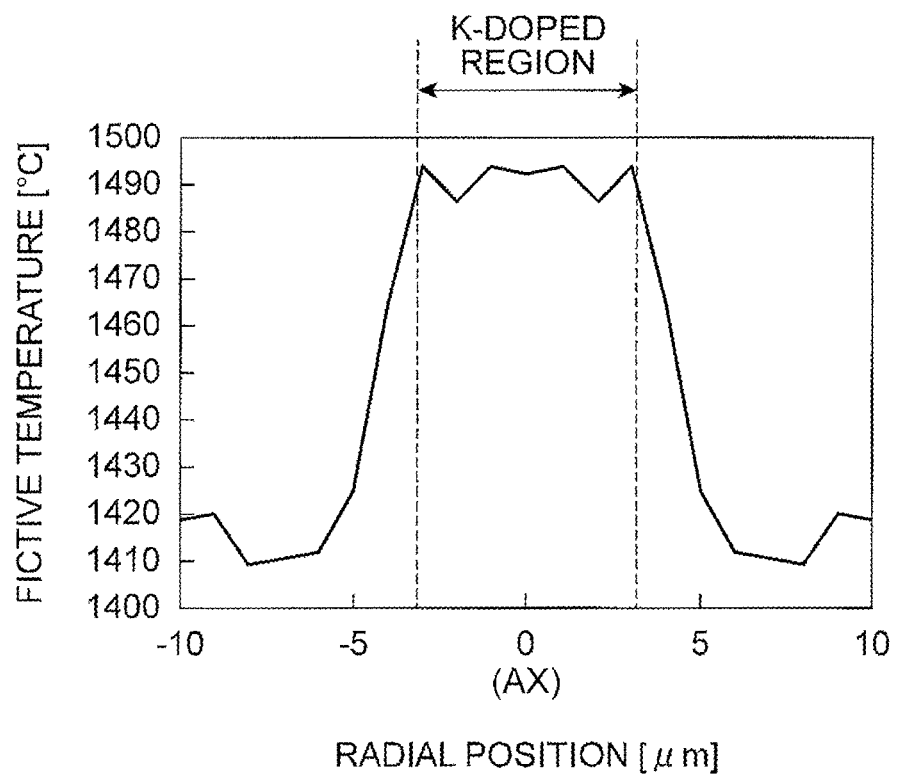
FIG. 3 is a diagram illustrating an example of a radial distribution of fictive temperatures in an optical fiber containing K in a core thereof.

FIG. 2 is a diagram illustrating an example of a radial distribution of residual stresses in the optical fiber 100 containing K (potassium) in the core thereof. FIG. 3 is a diagram illustrating an example of a radial distribution of fictive temperatures in the optical fiber 100 containing K in the core thereof. In FIG. 3, the region sandwiched by two dot lines denotes the K-doped region. FIGS. 2 and 3 illustrate a case where the core contains K with a fast diffusion rate as the dopant. A horizontal axis indicates a radial position from the central axis AX. On a vertical axis of FIG. 2, a tensile stress is set as "positive". As can be seen from FIGS. 2 and 3, an absolute value of the residual stress and the fictive temperature are each at a minimum in the cladding by spread of the dopant to the cladding.

Figure 4:
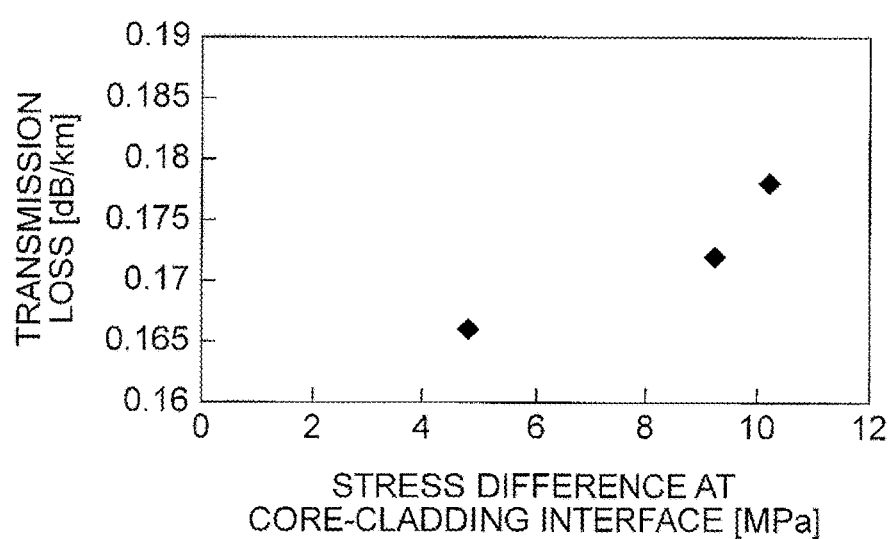
FIG. 4 is a diagram illustrating an example of a relationship between a stress difference at a core-cladding interface and a transmission loss.

FIG. 4 is a diagram illustrating an example of a relationship between a stress difference at a core-cladding interface of the optical fiber 100 and the transmission loss of the optical fiber 100. The stress difference at the core-cladding interface represents a difference between a maximum and minimum stresses within a range of 5 µm in the radial direction including the interface between the core and the cladding. FIG. 4 shows a tendency that the smaller the difference in stress at the core-cladding interface is, the lower transmission losses are. It is thought that this is attributable to a strain generated in the glass due to a stress generated at the core-cladding interface.

Figure 5:
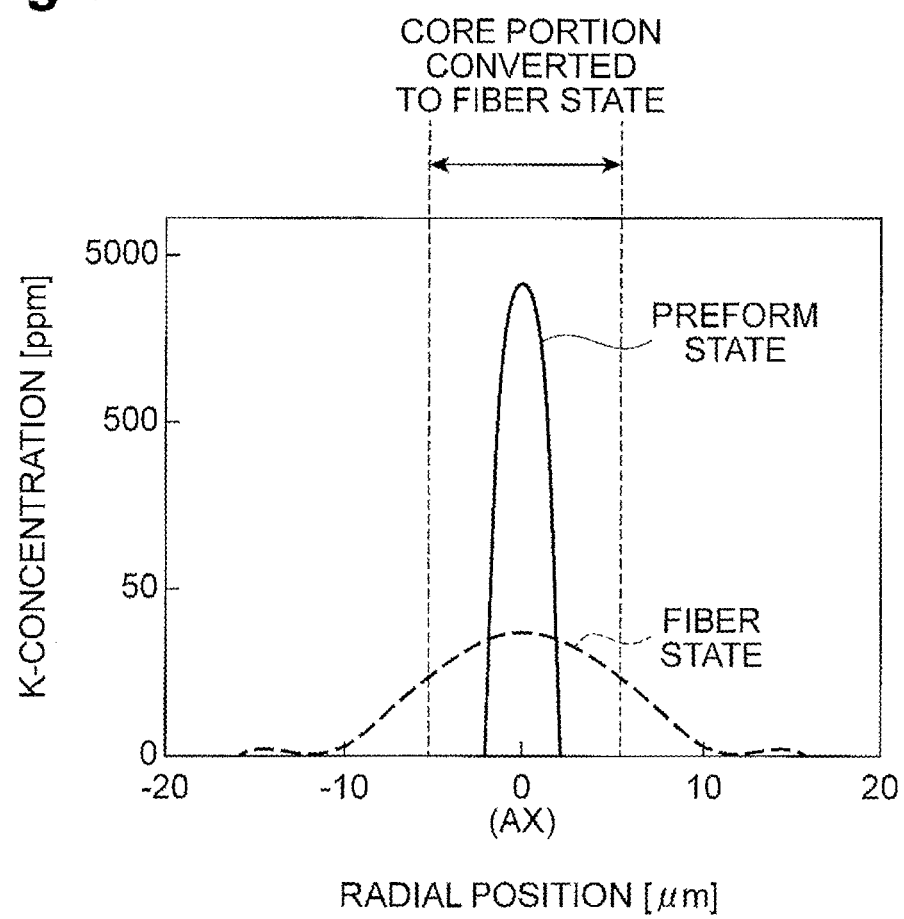
FIG. 5 is a diagram illustrating a concentration distribution in a case where a core contains K with a fast diffusion rate as a dopant.
Figure 6:
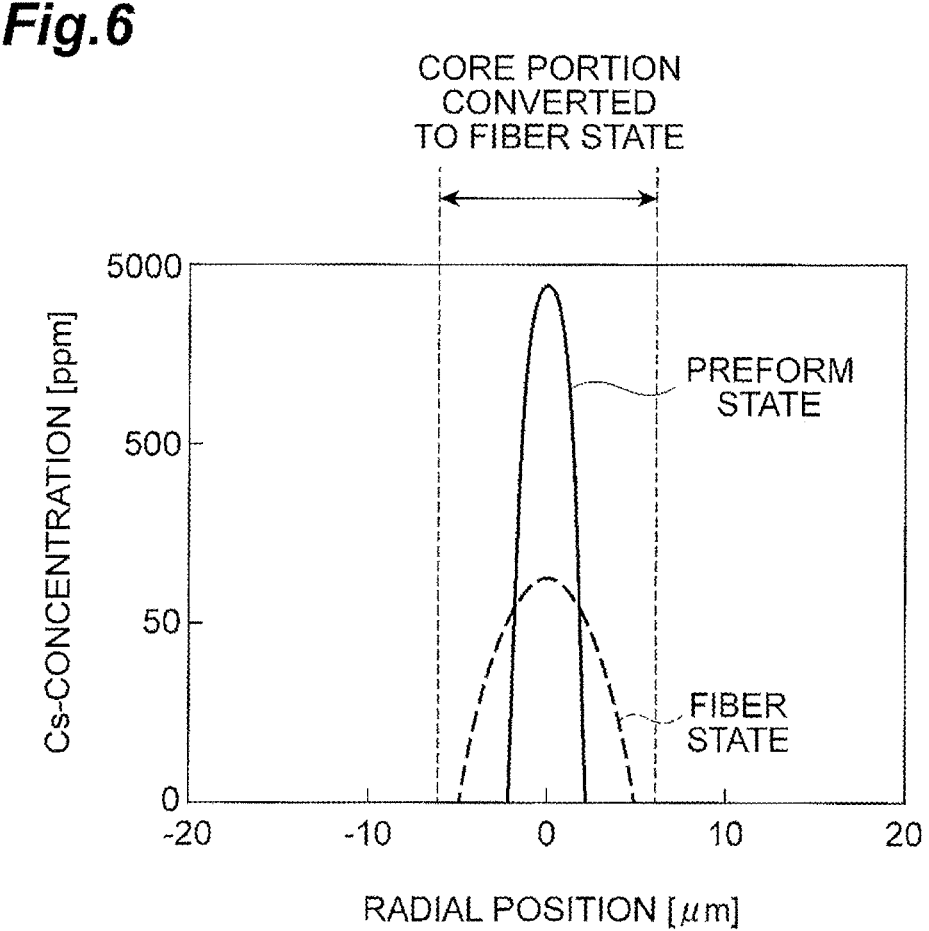
FIG. 6 is a diagram illustrating a concentration distribution in a case where a core contains Cs with a slow diffusion rate as a dopant.

Next, a case will be considered where the core contains a dopant with a slow diffusion rate. FIG. 5 is a diagram illustrating a concentration distribution in a case where the core of the optical fiber 100 contains K with a fast diffusion rate as a dopant. FIG. 6 is a diagram illustrating a concentration distribution in a case where the core of the optical fiber 100 contains Cs with a slow diffusion rate as a dopant. FIGS. 5 and 6 illustrate a dopant concentration distribution in a state of preform, plotted in the radial position of an optical fiber, superimposed on a dopant concentration distribution in a state of fiber.

As illustrated in FIG. 5, the K with a fast diffusion rate diffuses into the cladding in the state of fiber, while as illustrated in FIG. 6, the Cs with a slow diffusion rate does not diffuse into the cladding in the state of fiber. Therefore, a decline in stress of the cladding of the optical fiber 100 to be obtained can be suppressed by adding a dopant with a slow diffusion rate in the core portion 11 of the optical fiber preform 10. It is expected that the stress in the core portion 11 can be intensively decreased and the difference in stress at the core-cladding interface of the optical fiber 100 to be obtained can be reduced. In each of FIGS. 5 and 6, the region sandwiched by two dot lines denotes the core portion 11 converted to a fiber state so that a scale size of the core portion 11 corresponds to that of the core of the optical fiber 100.

However, where a dopant with a slow diffusion rate is solely doped in the core portion 11, in the optical fiber 110 to be obtained, the dopant does not diffuse into the cladding, but the dopant concentration distribution is high in the center of the core and low in an outer peripheral area thereof. Consequently, the viscosity in the outer peripheral area of the core does not decrease and the stress therein increases, resulting in a larger difference in stress at the core-cladding interface.

Figure 7:
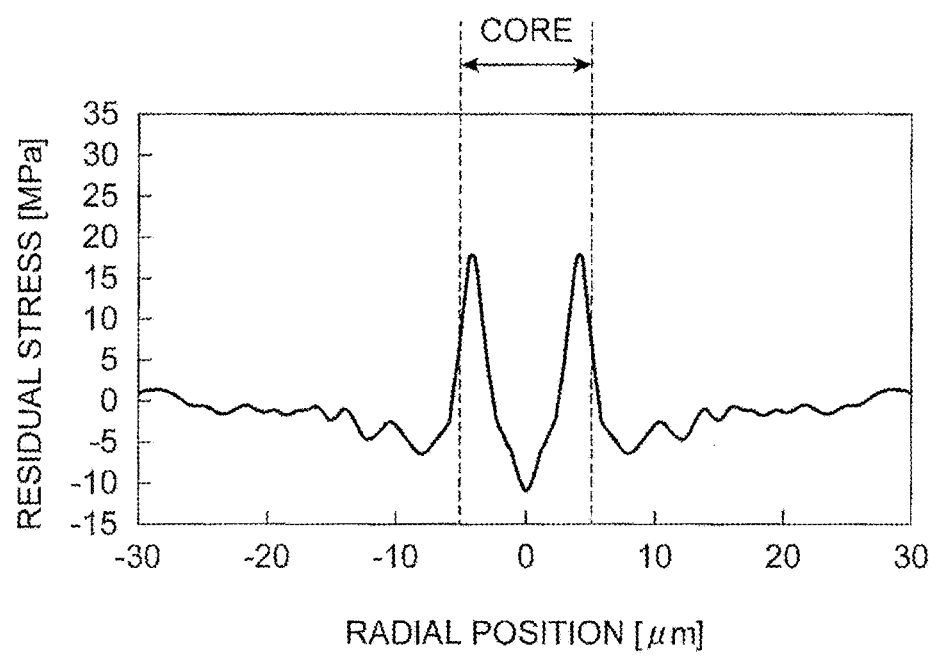
FIG. 7 is a diagram illustrating an example of a radial distribution of residual stresses in an optical fiber containing Ca in a core thereof.
Figure 8:
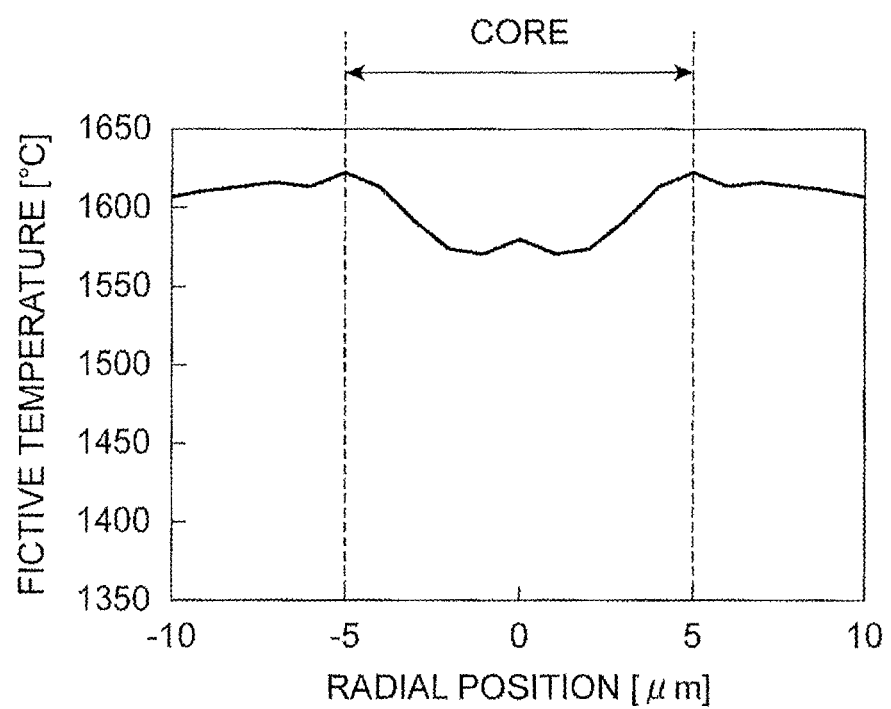
FIG. 8 is a diagram illustrating an example of a radial distribution of fictive temperatures in an optical fiber containing Ca in a core thereof.

FIG. 7 is a diagram illustrating an example of a radial distribution of residual stresses in the optical fiber 100 containing Ca in the core thereof. FIG. 8 is a diagram illustrating an example of a radial distribution of fictive temperatures in the optical fiber 100 containing Ca in the core thereof. FIGS. 7 and 8 illustrate a case where the core of the optical fiber 100 contains Ca with a slow diffusion rate as the dopant. The stronger tensile stress in the outer peripheral area of the core has widened the stress difference at the core-cladding interface to 25 MPa. The transmission loss of the optical fiber 100 has also deteriorated to 0.2 dB/km or more. As illustrated in FIG. 8, the fictive temperatures are decreased only in a central part of the core, and a sharp increase is seen in the outer peripheral area thereof. Therefore, it is thought that the viscosity is not reduced in the outer peripheral area of the core, and that the loss is increased.

Thus, the optical fiber preform 10 according to the present embodiment contains the first dopant to be selected from among Na, K, and their compounds at a concentration of 10 atomic ppm or more and 2,000 atomic ppm or less in the area (first dopant region) including the central axis AX of the core portion 11. The optical fiber preform 10 according to the present embodiment also contains the second dopant for reducing the viscosity of the silica glass, in the area (second dopant region) excluding the central axis AX of the core portion 11. As a characteristic at a temperature of 2,000° C. to 2,300° C., a diffusion coefficient of the second dopant is $1 \times 10^{-12}$ cm$^2$/s or higher, but the diffusion coefficient of the second dopant is lower than that of the first dopant. In addition, a concentration of the second dopant is set at 10 atomic ppm or more. The first dopant region containing the first dopant (area including the central axis AX of the core portion 11) and the second dopant region containing the second dopant (area excluding the central axis AX thereof) may or may not be partially superimposed over each other.

Figure 9:
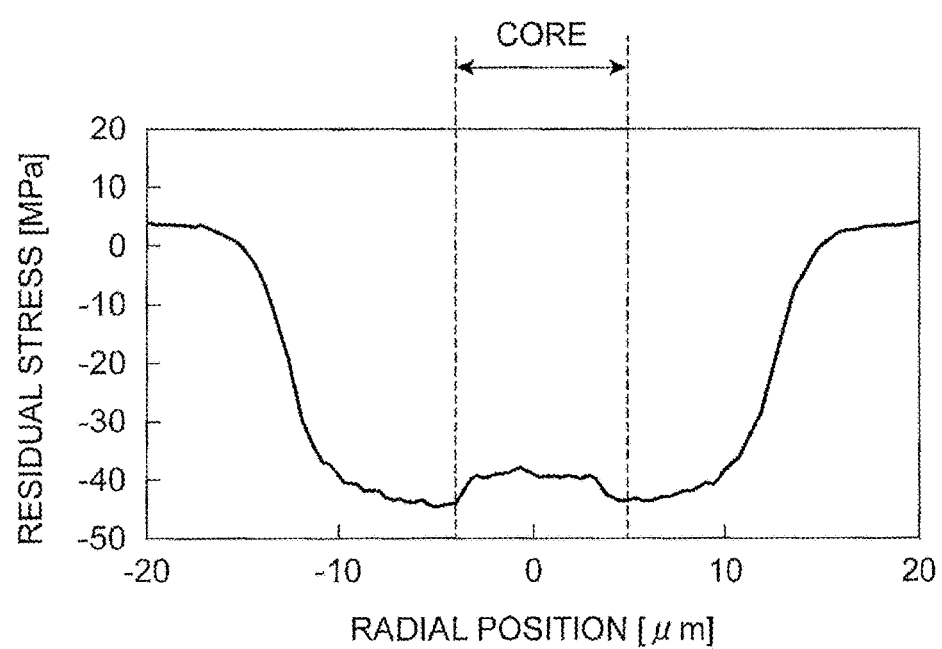
FIG. 9 is a diagram illustrating an example of a radial distribution of residual stresses in an optical fiber containing K and Ca in a core thereof.
Figure 10:
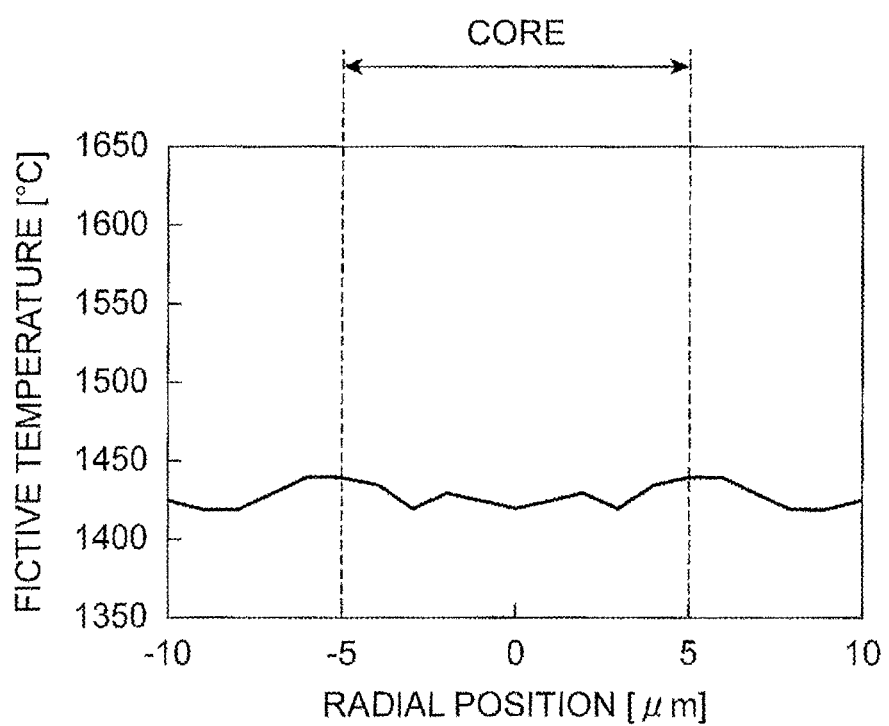
FIG. 10 is a diagram illustrating a radial distribution of fictive temperatures in an optical fiber containing K and Ca in a core thereof.

FIG. 9 is a diagram illustrating an example of a radial distribution of residual stresses in the optical fiber 100 containing K and Ca in the core thereof. FIG. 10 is a diagram illustrating a radial distribution of fictive temperatures in the optical fiber 100 containing K and Ca in the core thereof. Here, in terms of the state of fiber, K has been doped as the first dopant in a range from the center of the core to a radius of 1 μm, and Ca has been doped as the second dopant in a range from a radius of 2.0 μm to 2.5 μm. By drawing such an optical fiber preform, an optical fiber has been manufactured, and distributions of residual stresses and fictive temperatures of the optical fiber have been measured.

Thus, containing the first dopant with a fast diffusion rate in the first dopant region including the central axis AX of the core portion 11 as well as the second dopant with a slow diffusion rate in the second dopant region excluding the central axis AX of the core portion 11 allows the concentration of the dopant for reducing the viscosity of the silica glass to increase in a wide area of the core of the optical fiber 100 to be obtained. In the cores of the optical fibers to be obtained, as compared with a case where the first dopant is contained solely, containing the first and second dopants has uniformed the residual stresses of the entire core, reduced the stress difference at the core-cladding interface to 5 MPa, which is a half or less, and decreased the transmission loss of the optical fiber to 0.165 dB/km. With a difference in fictive temperature through the core to the cladding 50° C. or below, it is thought that glass scattering losses have been uniformly decreased across the core.

Figure 11:
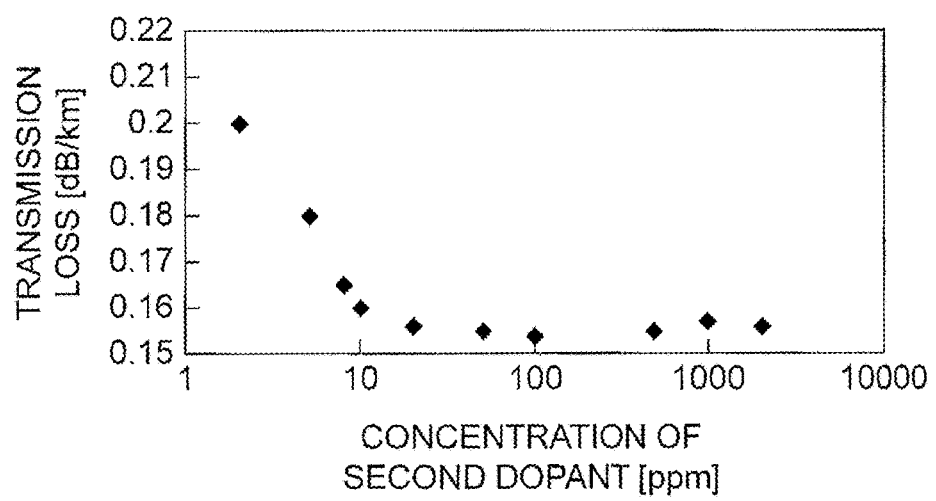
FIG. 11 is a diagram illustrating a relationship between a concentration of a second dopant and a transmission loss.

FIG. 11 is a diagram illustrating a relationship between the concentration of the second dopant and the transmission loss. Here, the concentration of the second dopant is, in terms of the state of fiber, a value in a range of 2.0 μm to 2.5 μm in radius. FIG. 11 shows that in a case where the concentration of the second dopant within the above range is 10 atomic ppm or more, the transmission loss is low at 0.160 dB/km or less. On the other hand, in a case where the concentration of the second dopant in the above range is higher than 5,000 atomic ppm, crystallization during a doping step has made it impossible to evaluate the loss.

Figure 12:
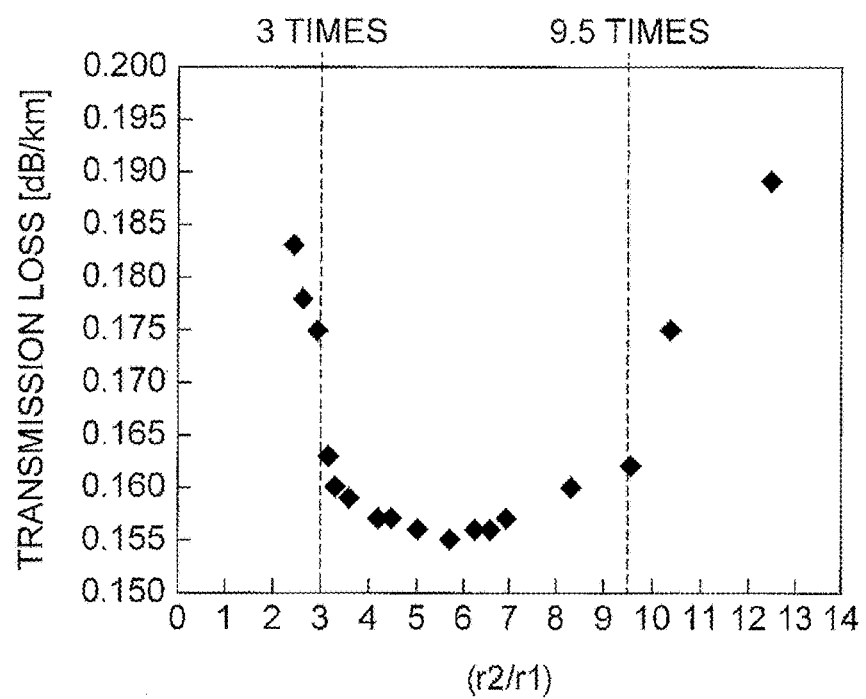
FIG. 12 is a diagram illustrating a relationship between a ratio (r2/r1) of a core radius r2 to a distance r1, defined as a distance from the central axis to a concentration peak position of a second dopant, and a transmission loss of an optical fiber.

FIG. 12 is a diagram illustrating a relationship between the ratio (r2/r1) of the core radius r2 to a distance r1, defined as a distance from the central axis AX to the concentration peak position of the second dopant, and the transmission loss of the optical fiber 100. Namely, the concentration peak position of the second dopant is a radial position from the central axis AX. Here, the optical fiber preform 10 has been fabricated by adding the first dopant at a position of 1 μm in radius in terms of the state of fiber of a glass rod serving as the core portion 11, as well as the second dopant such that the ratio (r2/r1) is 2.4 to 12.5, and applying the cladding portion thereto. By drawing the optical fiber preform 10, an optical fiber 100 has been manufactured, and the transmission loss of the obtained optical fiber 100 has been measured, As illustrated in FIG. 12, the ratio (r2/r1) is in a range higher than three and lower than 9.5, and the transmission loss of the optical fiber is smaller than 0.165 dB/km, In a case where the ratio (r2/r1) is lower than three, the concentration distribution of the second dopant in the state of fiber spreads to the cladding, and a lower residual stress of the cladding widens the difference in stress at the core-cladding interface and deteriorates the transmission loss. On the other hand, in a case where the ratio (r2/r1) is higher than nine, the concentration distribution of the second dopant in the state of fiber is smaller than the core diameter. A tensile stress is generated in the outer peripheral area of the core, and the stress difference at the core-cladding interface increases, which leads to a deterioration in transmission loss.

As the second dopant, any one to be selected from among Rb, Cs, Mg, Ca and Sr can be used. At a drawing temperature (2,000° C. to 2,300° C.), the diffusion coefficients of these second dopants are ½ to 1/10 of the diffusion coefficient of K. The doping of any one of these second dopants can suppress dopant-spreading due to diffusion in a drawing step inside the core. FIG. 13 is a table of each diffusion coefficient of Na, K, Cs, and. Ca. This table indicates diffusion coefficients at a temperature of 2,200° C. calculated by a molecular dynamics simulation. Na and K are used as the first dopant.

Figure 14:
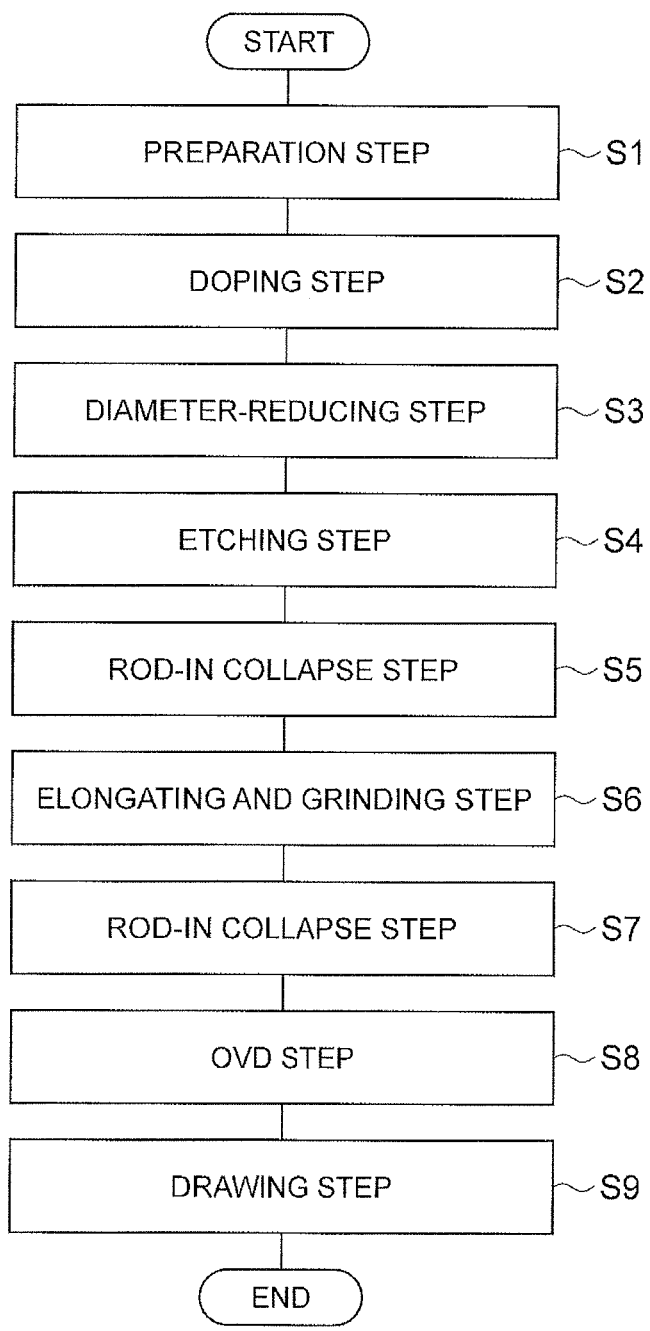
FIG. 14 is a diagram indicating steps for manufacturing an optical fiber preform according to the present embodiment and an optical fiber obtained from the optical fiber preform.

FIG. 14 is a diagram indicating steps for manufacturing the optical fiber preform according to the present embodiment and an optical fiber obtained from the optical fiber preform. An example of conditions in each step will also be described below.

In a preparation step (S1), a silica-based glass pipe, into which the second dopant is to be diffused, is prepared. This silica-based glass pipe contains 100 atomic ppm of chlorine (Cl) and 6,000 atomic ppm of F, with other dopants and impurities at a concentration of 10 mol ppm or less. An outer diameter of the silica-based glass pipe is 35 mm, and an inner diameter thereof is around 20 mm.

In the doping step (S2), Ca is doped as the second dopant on an inner surface of the silica-based glass pipe. CaBr (calcium bromide) is used as a raw material. The raw material is heated to a temperature of 1,000° C. by an external heat source, and a raw material vapor is generated. The silica-based glass pipe is heated such that a temperature of the outer surface thereof reaches 2,150° C. by an oxy-hydrogen burner from outside while the raw material vapor is introduced into an inside of the silica-based glass pipe together with a carrier gas that has introduced $O_2$ at a flow rate of 1 SLM (1 liter/min in terms of a standard state). At this time, the silica-based glass pipe is traversed by the burner at a rate of 40 mm/min and heated 15 turns in total, and the Ca is diffused and doped within the inner surface of the silica-based glass pipe.

In a diameter-reducing step (S3), the diameter of the silica-based glass pipe into which Ca is doped is reduced. At this time, the silica-based glass pipe is heated such that the temperature of the outer surface thereof reaches 2,250° C. by the external heat source while 0.5 SLM of $O_2$ is fed into the inside of the silica-based glass pipe. Traversed by the external heat source and heated six turns in total, the silica-based glass pipe is reduced in diameter until an internal diameter thereof becomes 5 mm.

In an etching step (S4), an inner surface of the silica-based glass pipe is etched. At this time, the silica-based glass pipe is heated by the external heat source for vapor-phase etching, while a mixed gas of $SF_6$ (sulfur hexafluoride: 0.2 SLM) and Cl (0.5 SLM) is introduced inside the silica-based glass pipe. This allows the inner surface of the pipe containing, at high concentration, the impurities doped together with the target dopant to be scraped, and these impurities can be removed.

In a rod-in collapse step (S5), a K-doped rod (potassium-doped rod) with a diameter of 5 mm, formed in advance by a known method described in, for example, Japanese Patent Application Laid-Open No. 2012-162409 and Japanese Patent Application (translation of PCT application) Laid-Open No. 2007-513862W), is inserted into the silica-based glass pipe into which Ca is doped. A mixed gas of $O_2$ (0.1 SLM) and $He_2$ (1 SLM) is introduced inside the silica-based glass pipe, which is collapsed at a surface temperature of 2,150° C. while an absolute pressure in the silica-based glass pipe is depressurized to 97 kPa or below. Through this collapsing, a core portion (25 mm in outer diameter) comprising a first core portion containing K as a first dopant, and a second core portion containing Ca as a second dopant, is obtained. The first core portion becomes a first dopant region containing the first dopant, and the second core portion becomes a second dopant region containing the second dopant. It is possible to apply a third core portion excluding a dopant on the outer periphery of the second core portion by an outside vapor deposition (OVD) method or a collapse method.

In an elongating and grinding step (S6), the core portion is elongated for setting a diameter thereof at 24 mm, and is further ground in the outer peripheral portion for setting the diameter of the core portion at 17 mm.

In the rod-in collapse step (S7), a first cladding portion is provided on the outer periphery of the core portion. At this time, a rod-in collapse method is used where the core portion is inserted inside the silica-based glass pipe doped with F, in order to integrate both of them by heating by the external heat source. A relative refractive index difference between the core and first cladding portions is up to around 0.34%. As a result of the integration by this rod-in collapse method, water amounts in the core portion and the first cladding portion in vicinity thereof can be suppressed to a sufficiently lower level.

In an OVD step (S8), after elongating the rod obtained by integrating the core portion and the first cladding portion so as to have a predetermined radius, an optical fiber preform is manufactured by depositing the second cladding portion containing F on the outer periphery of the rod by the OVD method.

In the drawing step (S9), as shown in FIG. 1, the optical fiber 100 can be obtained by drawing the optical fiber preform 10 manufactured by the above method for manufacturing an optical fiber preform. A drawing rate is 2,300 m/min, and a drawing tension is 0.5 N.

Measurement of a residual stress distribution of the optical fiber manufactured under the above conditions shows that a difference in stress from the center of the core to the cladding is flat at 5 MPa or lower. The transmission loss of the obtained optical fiber is 0.155 dB/km at a wavelength of 1,550 nm.

Figure 16:
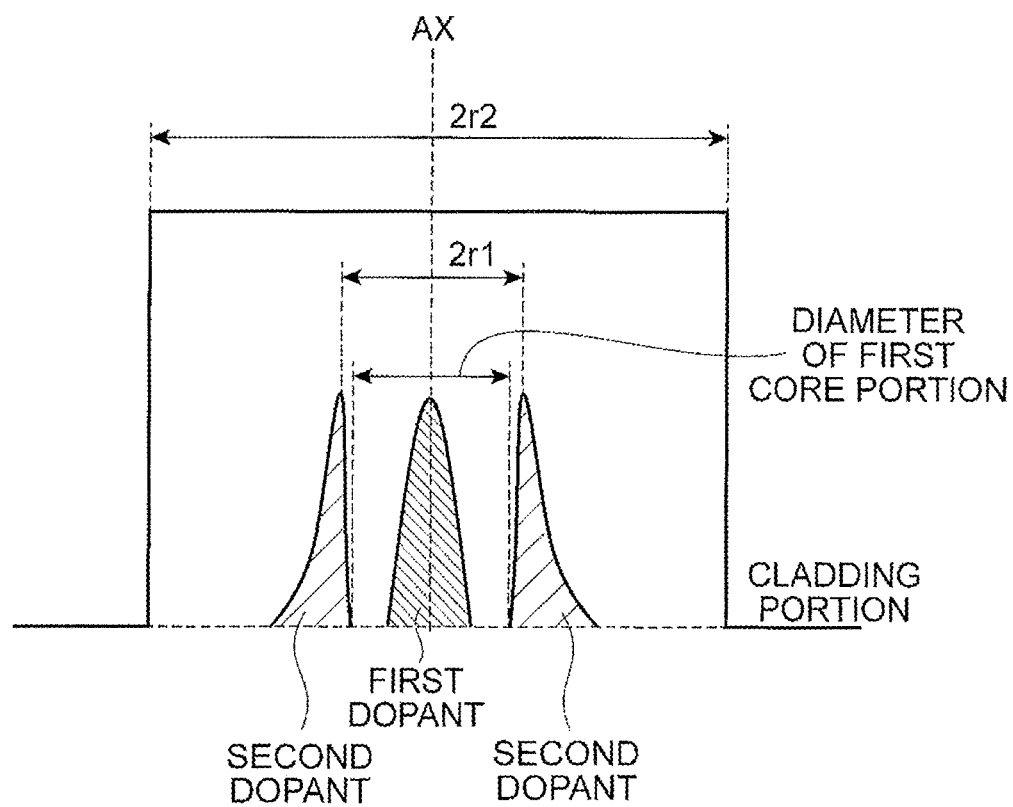
FIG. 16 is a diagram illustrating respective radial concentration distributions of first and second dopants in an optical fiber preform.

In terms of the core to be inserted in the rod-in collapse step (S5), the ratio (r2/r1) has been set at each value in a range between 2.4 and 12.5 by adjusting the radius of the first core portion containing the first dopant, and the transmission loss of each optical fiber has been evaluated. FIG. 15 is a table of specifications of each optical fiber preform according to the present embodiment and transmission losses of optical fibers obtained from these optical fiber preform. FIG. 16 is a diagram illustrating respective radial concentration distributions of the first and second dopants in the optical fiber preform. FIG. 15 illustrates, as specifications of the manufactured optical fiber preforms, a diameter of the first core portion, a maximum interval (2r1) between peaks of the second dopant in a diametric direction, a diameter (2r2) of the core portion 11, a ratio (r2/r1). Furthermore, FIG. 15 illustrates transmission losses of the optical fibers obtained from the optical fiber preforms whose specifications are shown in FIG. 15. Each diameter is a value when the glass rod serving as a core portion after the elongating and grinding step (S6) is completed.

What is claimed is:

1. An optical fiber preform comprising:
   a core portion comprised of silica glass and extending along a central axis thereof, in a cross-section of the optical fiber preform orthogonal to the central axis, the core portion having
      a first dopant region containing a first dopant and including the central axis, the first dopant being selected from among Na, K, and their compounds, a concentration of the first dopant being set at 10 atomic ppm or more but 2,000 atomic ppm or less, and
      a second dopant region containing a second dopant for reducing viscosity of the silica glass and surrounding the central axis while being away from the central axis, the second dopant having, as a characteristic at a temperature of 2,000° C. to 2,300° C., a diffusion coefficient of $1\times10^{-12}$ cm$^2$/s or higher but lower than that of the first dopant, a concentration of the second dopant being set at 10 atomic ppm or more; and
   a cladding portion comprised of silica glass and surrounding an outer periphery of the core portion, the cladding portion containing F and having a refractive index lower than that of the core portion.

2. The optical fiber preform according to claim 1, wherein a ratio (r2/r1) of a radius r2 of the core portion to a distance r1 from the central axis falls within a range from 3 to 9.5, the distance r1 being defined as a distance from the central axis to a position where a concentration peak of the second dopant exists.

3. The optical fiber preform according to claim 1, wherein the second dopant includes any one selected from among Rb, Cs, Mg, Ca, and Sr.

4. The optical fiber preform according to claim 2, wherein the second dopant includes any one selected from among Rb, Cs, Mg, Ca, and Sr.

5. The optical fiber preform according to claim 1, wherein, in the cross-section, the first and second dopant regions overlap each other.

6. The optical fiber preform according to claim 1, wherein, in the cross-section, an outer periphery of the first dopant region is away from or corresponds to an inner periphery of the second dopant region.

* * * * *